United States Patent Office 3,257,301
Patented June 21, 1966

3,257,301
PREPARATION OF SULFUR COMPOUNDS
Rector P. Louthan, Clarence R. Bresson, and Raymond L. Cobb, all of Bartlesville, Okla., assignors to Phillips Petroleum Company, a corporation of Delaware
No Drawing. Filed Apr. 9, 1962, Ser. No. 185,810
14 Claims. (Cl. 204—158)

This application is a continuation-in-part of our copending application, Serial No. 79,978, filed January 3, 1961, and abandoned December 18, 1962.

This invention relates to the preparation of sulfur compounds. More particularly, it relates to the preparation of amino-substituted mercaptans and/or thio-ethers by a free radical catalyzed reaction using for this purpose certain salts of amino-substituted olefins. In a preferred aspect, it relates to the preparation of amino-substituted primary mercaptans and/or thio-ethers by a free radical catalyzed reaction using salts of amino-substituted alpha-olefins as precursors.

We have discovered that useful amino-substituted mercaptans and/or thio-ethers can be prepared by the novel free radical catalyzed reaction of hydrogen sulfide or a primary mercaptan with certain salts of amino-substituted olefins. This new class of salts of amino-substituted olefins, as employed as reactants in this invention, can be represented by the following general structural formula:

$$R_1-\left(\begin{array}{c}R\\|\\C\\|\\R\end{array}\right)_x-\overset{R}{\underset{|}{C}}=\overset{R}{\underset{|}{C}}-\left(\begin{array}{c}R\\|\\C\\|\\R\end{array}\right)_y-\overset{R}{\underset{|}{C}}-\overset{R}{\underset{|}{N}}\cdot HX \quad (I)$$

where

R is selected from the group consisting of hydrogen and alkyl radicals having 1 to 10 carbon atoms,
$R_1$ and $R_2$ are selected from the group consisting of hydrogen and alkyl radicals having 1 to 10 carbon atoms, and together can form a covalent bond,
X is selected from the group consisting of chloride, bromide, iodide, acetate, and propionate radicals,
$x$ is an integer from 0 to 3, and
$y$ is an integer from 0 to 5.

Representative salts of amino-substituted olefins useful in the practice of this invention, but by no means exclusive, and coming within the general Formula I, include:

Allylamine hydrochloride, methallylamine hydrochloride,
4-methyl-4-pentenylamine hydrobromide,
Allylamine hydrobromide,
Allylamine hydroiodide,
Allylamine acetate,
Allylamine propionate,
N-methylallylamine hydrochloride,
N-ethylallylamine acetate,
N-ethyl(1-ethylallyl)amine acetate,
N,N-di-n-propylallylamine hydroiodide,
N-isopropyl(2-isopropyl-3-butenyl)amine propionate,
3-butenylamine hydrochloride,
N,N-dimethyl(2-ethyl-4-pentenyl)amine propionate,
N,N-di-n-decyl(5-hexenyl)amine hydrobromide,
1,1,2,2-tetraethyl-3-butenylamine hydrochloride,
1-methylallylamine hydrochloride,
1,1-di-n-propylallylamine hydrobromide,
5-hexenylamine hydrochloride,
4-pentenylamine acetate,
N-ethyl(1-methylallyl)amine acetate,
N-ethyl-N-n-propyl(1-methyl-2,2-diethyl-3-butenyl)amine acetate,
1-methyl-1-n-propyl-7-octenylamine hydrochloride,
N,N-diethyl(1,1-diethyl-3-butenyl)amine acetate,
N,N-dimethyl(3-butenyl)amine hydrobromide,
N,N-dipentyl(2-n-decyl-3-n-pentylheptenyl)amine acetate,
N-ethyl-N-n-decyl(1-n-propyl-1-n-decylallyl)amine acetate,
N-ethyl-N-methyl(1-ethyl-1-methylallyl)amine hydroiodide,
2-butenyl-1-amine hydrochloride,
2-pentenyl-1-amine hydrobromide,
3-pentenyl-1-amine hydroiodide,
N,N-dimethyl-3-octenyl-1-amine acetate,
N-decyl-4-pentenyl-1-amine propionate,
N,N-diethyl-2,3-dimethyl-2-hexenyl-1-amine hydrochloride,
N,N,1,1,2,2,3,4,5,5-decamethyl-3-hexenyl-1-amine hydrobromide,
N-n-propyl-2-tert-butyl-4-octenyl-1-amine hydroiodide,
N,N-diethyl-5-ethyl-3-dodecenyl-1-amine acetate,
N,N-di-n-hexyl-2-butenyl-1-amine propionate,
3-aminocyclohexene hydrochloride,
1,2-dimethyl-4-aminocyclohexene hydrobromide,
N,N-dimethyl-3-n-propyl-3-aminocyclohexene hydroiodide,
N,N-di-n-butyl-3-aminocyclopentene hydrochloride,
N-methyl-4,8-di-n-butyl-6-aminocyclononene acetate,
N-n-pentyl-3,4,6,7-tetramethyl-5-aminocyclooctene propionate,
N,N,1,2,3,3,4,5,5,6,6,7,7-tridecamethyl-4-aminocycloheptene hydrochloride, and the like.

The preferred salts are those which contain less than about 30 carbon atoms per molecule. These salts can be prepared by well-known procedures, for example by acidifying the free amino-substituted olefins with hydrochloric acid, hydrobromic acid, hydroiodic acid, acetic acid, or propionic acid. The R, $R_1$, and $R_2$ radicals of Formula I are substituents which are inert in the reaction of these salts with hydrogen sulfide or primary mercaptans, according to this invention.

A preferred sub-genus of salts coming within the scope of general Formula I are salts of amino-substituted alpha-olefins represented by the following general formula:

$$H_2C=\overset{H}{\underset{|}{C}}-\left(\begin{array}{c}R\\|\\C\\|\\R\end{array}\right)_y-\overset{R}{\underset{|}{C}}-\overset{R}{\underset{|}{N}}\cdot HX \quad (II)$$

wherein R, X and $y$ are the same as that defined for Formula I. The salts coming within the scope of Formula II are preferred because the products formed by reaction of the same with hydrogen sulfide or a primary mercaptan are anti-Markownikoff products with little, if any, Markownikoff products being formed by the reaction. This is surprising because we have found that when amino-substituted ethylenically unsaturated compounds, such as allylamine, are reacted with hydrogen sulfide in the presence of free radical catalysts, both Markownikoff and anti-Markownikoff products are formed. The preparation and synthesis of significant and economically attractive amounts of anti-Markownikoff products, such as 3-mercaptopropylamine, from the non-salt or free amino-substituted alpha-olefins, such as allylamine, has been difficult due to low conversions to the anti-Markownikoff product and the concurrent production of Markownikoff products, such as 2-mercaptopropylamine, in greater amounts than the anti-Markownikoff product. Thus, by employing the above described amino-substituted salts of alpha-olefins, according to this invention, significant and economically attractive amounts of the anti-Markownikoff products can be formed. According to the Markownikoff rule, the sulfhydryl group of the hydrogen sulfide (or the RS— group of the primary mercaptan) reactant would become affixed to the unsaturated carbon atom holding the lesser number of hydrogen atoms, and when the addition occurs contrary to the Markownikoff rule, the sulfhydryl group becomes affixed to the unsaturated carbon atom holding the most hydrogen atoms.

Other useful subgenera of amino-substituted olefins coming within the scope of Formula I, can be represented by the following general formulas:

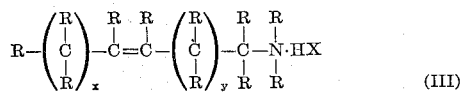
(III)

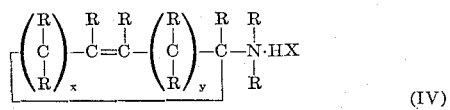
(IV)

wherein R, X, x and y of Formulas III and IV are the same as that defined for Formula I.

Note that the salts of Formulas III and IV are different from that of Formula II in that the salts of Formulas III and IV contain internal ethylenic unsaturation and the salts of Formula II contain terminal ethylenic unsaturation. Where the salts used in this invention have terminal unsaturation, the resulting products will be anti-Markownikoff products in the form of salts of amino-substituted primary mercaptans and/or salts of amino-substituted primary thio-ethers. And where the salts used in this invention have internal unsaturation, the resulting products will be salts of amino-substituted secondary or tertiary mercaptans and/or salts of amino-substituted secondary or tertiary thio-ethers. The initial products formed by the free radical catalyzed reaction of this invention will be the above-described salts of mercaptans and/or thio-ethers, and they can be readily converted to the corresponding free or non-salt compounds, for example by treating the same with a base such as sodium hydroxide.

The aforementioned salts of amino-substituted olefins are reacted according to this invention with hydrogen sulfide or a primary mercaptan. Generally, these latter reactants can be expressed by the general formula R'SH, where R' is selected from the group consisting of hydrogen, and alkyl or aralkyl radicals each having 1 to 12 carbon atoms. In addition to hydrogen sulfide, the preferred reactant, other reactants of this type include such primary mercaptans as methyl mercaptan, ethyl mercaptan, n-propyl mercaptan, n-butyl mercaptan, 2-methylpropyl mercaptan, 3-ethyldecyl mercaptan, n-dodecyl mercaptan, phenylmethyl mercaptan, 6-phenylhexyl mercaptan, 3-phenylbutyl mercaptan, and the like. The amount of R'SH used in the above-described reaction will vary, and generally be in the range between 0.1 and 10 moles, preferably 0.4 and 4 moles, per mole of the amino-substituted olefin salt.

Any of the free radical catalytic agents heretofore used in catalyzing the reaction of hydrogen sulfide and hydrocarbons having an olefinic linkage can be used in the practice of this invention. For example, peroxide compounds, organic azo compounds, and actinic radiation, such as ultraviolet radiation, can be employed as free radical catalytic agents. Representative peroxide compounds which can be used for this purpose include di-tertiaryalkyl peroxides such as di-tertiarybutyl peroxide and other peroxides such as alkyl hydroperoxides, alkyl peroxy esters, diacyl peroxides, and the like. Suitable azo catalysts which can be used representatively include those having an acyclic azo group, —N=N—, bonded to different non-aromatics, i.e., aliphatic or cycloaliphatic carbons, at least one of which is tertiary, e.g., alpha,alpha'-azodiisobutyronitrile, alpha,alpha' - azobis(alpha,gamma - dimethylvaleronitrile), and the like, such as those disclosed in U.S. Patents 2,471,959, 2,492,763 and 2,503,253.

The actinic radiation which can be used as a free radical catalyst in carrying out the method of this invention will generally have a potential or energy level in the range of 3.1 to 1×10$^8$ electron volts. The radiation dose rate will generally be from 10$^3$ to 10$^7$ roentgens equivalent physical per hour (rep/hr.), and the total radiation dosage will generally be from 10$^5$ to 10$^{11}$ reps, preferably 10$^7$ to 10$^9$ reps. Lower radiation rates can be used but are not practical from a time standpoint since the rate of reaction will be correspondingly slow, and higher rates, although useable, are difficult to attain and are not necessary in the practice of this invention. The radiation dosages and rates, as used herein, are internal or actual dosages and rates received by the reaction system. The unit of roentgen equivalent physical corresponds to an absorption of 93 ergs/gram of material, the material being water, hydrocarbon or rubber which have very nearly the same absorption co-efficients. The unit of roentgen equivalent physical is also equal to 5.80×10$^{13}$ electron volts.

Actinic radiation useful in the practice of this invention include activating rays such as ultraviolet rays having a wavelength in the range of 100 to 3800 Angstroms, and ionizing rays such as alpha rays, beta rays, gamma rays, X-rays, deuterons, protons, and neutrons. The ultraviolet rays can be supplied from lamps or other apparatus which are available for generation of such rays. Sources of radiation include electrical devices such as cathode tubes, which produce electrons, and various accelerators, such as cyclotrons, synchrotrons, betatrons, which produce electrons, protons, deuterons and alpha particles. The natural and artifical radio-active elements can also be used as sources of radiation. The radioactive isotopes of radium, thorium, bismuth, palladium, cobalt, phosphorus, strontium, and the like can be used as a source of rays. Spent fuel elements can also be used as radiation sources, particularly since they are a low cost source of ionizing radiation. Still another source of ionizing radiation are the highly energetic fragments which result at the moment of fission.

Reaction promoters can be used in the method of this invention in addition to free radical catalysts. In particular, organic tri-alkyl phosphites having the general formula (R''O)$_3$P, where R'' is an alkyl radical having 1 to 10 carbon atoms, and preferably where each R'' is the same normal alkyl radical having 1 to 5 carbon atoms, can be used as promoters, particularly in conjunction with ultraviolet radiation. The amount of promoter used can very and stated functionally will be that amount sufficient to promote the reaction and increase the conversion; for most applications, the amount of reaction promoter will be in the range of 0.001 and 100 moles per mole of the amino-substituted olefin salts.

Representative phosphite reaction promoters useful in the practice of this invention include trimethyl phosphite, triethyl phosphite, tripropyl phosphite, tributyl phosphite, tripentyl phosphite, dimethyl ethyl phosphite, diethyl methyl phosphite, methyl ethyl propyl phosphite, dimethyl propyl phosphite, diethyl butyl phosphite, dibutyl propyl phosphite, trihexyl phosphite, triheptyl phosphite, trioctyl phosphite, trinonyl hosphite, tridecyl phosphite, dihexyl octyl phosphite, hexyl heptyl octyl phosphite, dihexyl nonyl phosphite, dimethyl decyl phosphite, didecyl pentyl phosphite, triisopropyl phosphite, trissopentyl phosphite, triisobutyl phosphite, dimethyl isobutyl phosphite, diethyl isooctyl phosphite, and the like.

The free radical catalyzed reaction of this invention can also be carried out in the presence of solvents or diluents, such as water and low molecular weight alcohols such as methanol, ethanol, isopropanol, n-pentanol, and the like. Where the amino-substituted olefin salt used has a fairly high molecular weight, the solvents used should also preferably have a fairly high molecular weight. In some cases the above-described R'SH mercaptan compounds can also serve as the solvent or diluent in the reaction.

The reaction of this invention can be carried out in a manner like that of the prior art, and may be effected in a batch, intermittent, or continuous manner. The reaction temperature can vary over a wide range, and generally will be within −45 and 150° C., preferably from 10 to 65° C., although the upper limit is dictated by pressure, since some of the lower molecular weight reactants will have an extremely high vapor pressure which will entail the use of high pressure vessels if the reaction is carried out at temperatures outside of this range. The pressure at which the reaction is carried out will also vary. Generally speaking, the reaction times will also vary and can be carried out, for example, within the range between 0.5 and 20 hours, preferably 1 to 5 hours.

After reaction is completed, the products of reaction can be recovered by well-known means. For example, gases can be recovered and recycled, if desired, and the liquid product fractionated, distilled, crystallized, or subjected to various other separation and recovery procedures to obtain the desired products.

The products prepared according to this invention are useful for a number of purposes, such as pesticides, dyestuff intermediates, pharmaceuticals (such as anti-radiation drugs) inhibitors for enzymatic deterioration of plants, and rubber polymerization chemicals, such as polymerization modifiers and anti-oxidants. A particularly useful product of this invention which can be used as an anti-radiation drug is 3-mercaptopropylamine.

Representative salts of amino-substituted mercaptans and thio-ethers which can be made according to the practice of this invention include 3-aminopropyl mercaptan hydrochloride,
4-aminobutyl methyl thio-ether hydrobromide,
3-(N,N-dimethylamino)hexyl n-butyl thio-ether acetate,
4-n-propyl-6-(N,N-dietheylamino)hexyl benzyl thio-ether hydroiodide,
8-(N,N-di-n-decylamino)octyl mercaptan acetate,
9-amino-3,3,4,4,5,5,6,6,7,7,8-undecamethylnonyl mercaptan hydrochloride,
3-(N-methyl-N-n-propylamino)hexyl phenylethyl thio-ether propionate,
5-(N-n-pentylamino)-3-ethylpentyl 6-phenylhexyl thio-ether hydrochloride,
3,5-dimethyl-7-(N-methylamino)heptyl n-propyl thio-ether acetate,
3-aminopropyl n-dodecyl thio-ether propionate,
8-(N,N-di-n-pentylamino)octyl n-dodecyl thio-ether hydrochloride,
3-methyl-3-(N,N-di-n-octylamino)butyl mercaptan propionate,
Di(3-aminopropyl) thio-ether dihydrochloride,
Di(3-[N,N-di-n-decyl]-n-decyl)thio-ether dihydrobromide,
3-aminopropyl benzyl thio-ether propionate,
4-(N-n-butylamino)-3-ethylhexyl 2-phenylpropyl thio-ether hydrochloride,
Di(4-[N-propylamino]butyl)thio-ether dihydroiodide,
1-amino-2-butanethiol hydrochloride,
1-(N,N-diethylamino)-6-methyl-5-octanethiol hydrobromide,
N-ethyl-N,1,4-trimethyl-1-amino-7-dodecanethiol hydroiodide,
1-(N-decylamino)-5-pentanethiol acetate,
5-(N,N-dimethylamino)-3-pentadecanethiol propionate,
1-(N,N-dimethylaminomethyl)propyl n-dodecyl thio-ether hydrochloride,
1-ethyl-4-(N-isopropyl-N-tert-butylamino)butyl methyl thio-ether hydrobromide,
1-(N,N-di-n-octylaminomethyl)propyl n-dodecyl thio-ether acetate,
1-amino-7-eicosanethiol hydroiodide,
2-(N,N-dimethylamino)-2,3,3,4,5,6,6-heptamethyl-4-heptanethiol propionate,
3-(N-n-decylamino)cyclohexyl methyl thio-ether acetate,
5-(N-methyl-N-ethylamino)cyclooctyl sec-dodecyl thio-ether hydrobromide,
2-(N-pentyl-N-decylamino)cyclopentyl tert-butyl thio-ether hydrobromide,
N,N,1,2,2,3,3,4,5,5,6-undecamethyl-4-aminocyclohexyl tert-dodecyl thio-ether propionate,
5-n-decyl-3-aminocyclohexyl ethyl thio-ether hydrochloride,
Trans-2-aminocyclohexanethiol hydrochloride,
Cis-2-aminocyclohexanethiol hydrochloride,
Cis-4-(N-ethylamino)-2,3-dimethylcycloheptanethiol hydrobromide,
Trans-2-(N,N-diisopropylamino)-4-tert-butylcyclopentanethiol acetate,
2-aminocyclopropanethiol hydrochloride,
6-(N-n-pentyl-N-n-butylamino)cycloundecanethiol hydroiodide,
and the like.

The following examples further illustrate the objects and advantages of this invention, but it should be understood that the various ingredients or reactants, amounts, temperatures, pressures, and other conditions recited in these examples should not be construed so as to unduly limit this invention.

EXAMPLE I

In this example, a run was carried out wherein a mixture of allylamine hydrochloride and hydrogen sulfide was subjected to a free radical catalyzed reaction according to this invention, and two other runs were made wherein mixtures of allylamine and hydrogen sulfide were also subjected to free radical catalyzed reactions. In each run the identities and amounts of products obtained were determined.

In the first run, according to this invention, a mixture of 373 g. of allylamine hydrochloride, 233.5 g. of water, and 272 g. of hydrogen sulfide was irradiated for 8 hrs. with gamma radiation from a 3.3 kw. electron beam hitting a tungsten target. After an estimated total dose of $6 \times 10^7$ reps, the water was distilled off from the reaction mixture and the latter then dissolved in 200 cc. of isopropyl alcohol. The resulting solution was neutralized by adding solid sodium hydroxide under a nitrogen atmosphere and adding a few pieces of Dry Ice to the mixture to neutralize the excess sodium hydroxide. The mixture was then filtered under nitrogen and the isopropyl alcohol distilled off under nitrogen. This procedure yielded products consisting of 45 g. of 3-mercaptopropylamine and 147 g. of di(3-aminopropyl)sulfide. Both of these products are anti-Markownikoff products, and no Markownikoff products were formed. Said anti-Markownikoff products were formed by a 92 mol percent conversion of the allylamine hydrochloride.

In the second run, a mixture containing 285 g. of allylamine and 510 g. of hydrogen sulfide was irradiated for 4 hrs. with gamma radiation from a 3 kw. electron beam hitting a tungsten target. After a total radiation dose of $3 \times 10^7$ reps, the mixture was distilled rapidly through a packed column, yielding 113.3 g. of unreacted allylamine, 18.5 g. of kettle product and 175.3 g. of a product cut. Fifty cc. of diphenyl ether was added to the product cut and the resulting solution was distilled at atmospheric pressure and yielded 121 g. of 2-mercaptopropylamine (a Markownikoff product) and 22 g. of 3-mercaptopropylamine (an anti-Markownikoff product).

In the third run, a mixture of 285 g. of allylamine, 510 g. of hydrogen sulfide, and 7.5 g. of alpha,alpha'-azodiisobutyronitrile was charged to a bomb and placed in a water bath at 85° C. for 4 hrs., during which time the maximum pressure developed in the bomb was 865 p.s.i.g. The reaction mixture was then flashed overhead through a packed column to yield 92.8 g. of unreacted allylamine, 55.4 g. of kettle product, and 191.4 g. of a product cut. Redistillation of the product cut yielded 100 g. of 2-mercaptopropylamine (a Markownikoff product) and 30 g. of 3-mercaptopropylamine (an anti-Markownikoff product).

These three runs show that when allylamine hydrochloride is subjected to the free radical catalyzed reaction, according to this invention, only anti-Markownikoff products are obtained, whereas when allylamine is subjected to free radical catalyzed reactions both Markownikoff and anti-Markownikoff products are obtained, with the former predominating.

EXAMPLE II

A series of runs were carried out in which allylamine salts were reacted with hydrogen sulfide in the presence of ultraviolet light or other free radical source and in the presence or absence of trimethyl phosphite promoters.

In these runs, the reactants were charged to a 500 cc. stainless steel reactor fabricated from 3″ pipe, approximately 6″ long. A 33 mm. I.D. quartz tube was sealed into both ends of the pipe so that the reaction mixture was contained in the annulus. The reactor was equipped with a pressure gauge, a thermowell and a cooling coil. After charging the reactants, the reactor was mounted on a shaker, a lighted 450 watt mercury vapor lamp was inserted in the quartz tube, and the shaker started. The mol ratio of hydrogen sulfide to the allylamine salt in Run No. 7 was 4 and in all other runs was 2. The reaction time in Run No. 1 was 240 min. and in all other runs was 60 min.

After the irradiation period, the lamp was turned off, and the products were recovered by one of two procedures. In one procedure, used for runs where water was used, the water was evaporated off and the remainder was dissolved in 200 c.. of isopropyl alcohol. This solution was then worked up by the procedure employed for the runs using non-aqueous solvent.

The runs using non-aqueous solvent were treated by adding a slight excess of solid sodium hydroxide under nitrogen. After this neutralization was completed, a few small pieces of Dry Ice were added to the mixture to neutralize the excess sodium hydroxide. The mixture was then filtered under nitrogen, and the isopropyl alcohol was distilled off under nitrogen. The products were then distilled under nitrogen. The results are expressed as Table I.

In these runs, all of the products were from anti-Markownikoff addtion, thus the mercaptan formed was 3-mercaptopropylamine (or salt) and the thio-ether formed was di(3-aminopropyl) sulfide (or salt). It can be seen from Table I that the conversion is improved substantially by use of the phosphite promoters.

elemental analysis of this product was made, the results of which are given in Table II.

Table II

|  | Calculated (for $C_3H_9NS$), wt. percent | Found, wt. percent |
| --- | --- | --- |
| Carbon | 39.51 | 39.51 |
| Hydrogen | 9.97 | 9.94 |
| Nitrogen | 15.36 | 15.3 |
| Sulfur: |  |  |
| Total | 35.16 | 34.3 |
| Mercaptan | 35.16 | 33.9 |

EXAMPLE IV

A mixture of 107.5 g. of 3-aminobutene-1 hydrochloride, 105 cc. of isopropanol, 102 g. of hydrogen sulfide, and 4 cc. of trimethyl phosphite was irradiated for 60 irradiated with the light of a 450 watt mercury vapor lamp at 22.8–38.9° C., according to the procedure of Example II. The products recovered consisted of 43 g. of 3-amino-butane-1-thiol and 24 g. of di(3-aminobutyl)sulfide, both being anti-Markownikoff products.

EXAMPLE V

Two runs were carried out in which 3-aminopentene-1 hydrochloride was reacted with $H_2S$ in the presence of ultraviolet light and a reaction promoter according to the process of this invention.

In each of these runs, a mixture of 1 mole (121.5 g.) of 3-aminopentene-1 hydrochloride, 100 g. of methyl alcohol, 104 g. of $H_2S$ and 4 cc. of trimethyl phosphite was irradiated with the light of a 450 watt mercury vapor lamp at approximately 24–38° C. according to the procedure of Example II. In one run an irradiation time of 1 hr. was used, while a 2 hr. irradiation time was employed in the other run. The products were then recovered by the non-aqueous solvent method of Example II.

The yield of 3-aminopentane-1-thiol from the one hour irradiation run was 39.2 g., boiling 74–82° C. at 17 mm. Hg absolute pressure. The yield of this thiol from the run employing a 2 hr. irradiation time was 48.8 g., boiling 76–79° C. at 18 mm. Hg absolute pressure.

Table I

| Run No. | Amt. of allylamine salt used, g. | Amt. of $H_2S$ used, g. | Solvent used | Amt. of solvent used, g. | Reaction temp., ° C. | Amt. of phosphite used, wt. percent of allylamine salt | Conversion of allylamine salt, mole percent | Yield of mercaptan per pass, mole percent |
| --- | --- | --- | --- | --- | --- | --- | --- | --- |
| 1 [a] | 285 | 204 | n-Propanol | 300 | 37.8-85 | 0 | 36.0 | 21.7 |
| 2 | 142.5 | 102 | ---do--- | 150 | 29.4-38.4 | 2.2 | 57.6 | 39 |
| 3 | 142.5 | 102 | Methanol | 150 | 27.8-36.1 | 0 | 34.6 | 14.5 |
| 4 | 142.5 | 102 | ---do--- | 150 | 28.3-37.8 | 2.2 | 60.6 | 45.2 |
| 5 | 142.5 | 102 | ---do--- | 150 | 28.3-37.2 | 3.7 | 86.3 | 52.5 |
| 6 [b] | 142.5 | 102 | Isopropanol | 150 | 28.9-31.1 | 3.7 | 77.6 | 41.7 |
| 7 | 93.5 | 136 | ---do--- | 100 | 29.4-36.7 | 3.7 | 81.3 | 54.5 |
| 8 [c] | 85.5 | 102 | Acetic acid | 200 | 27.2-41.7 | 1.8 | 20.0 | 10.0 |

[a] In Run No. 1, alpha, alpha'-azodiisobutyronitrile (4.5 g.) was used as free radical catalyst, whereas in all other runs ultraviolet radiation was used.
[b] In Run No. 6, a 100 watt mercury vapor lamp was used, whereas in the Run Nos. 2, 3, 4, 5, 7 and 8 a 450 watt mercury vapor lamp was used.
[c] In Run No. 8, allylamine was charged and converted in the reactor to the acetate salt by reaction with the acetic acid solvent, whereas in all other runs allylamine hydrochloride was charged to the reactor.

EXAMPLE III

In this example, 187 g. of allylamine hydrochloride, 6 cc. of trimethyl phosphite, and 136 g. of hydrogen sulfide were charged to the reactor used in Example II and the mixture irradiated with ultraviolet light from a 450 watt mercury vapor lamp for 60 min. at 10–26° C. and 190–311 p.s.i.g. pressure. After working up the product by the procedure of Example II (where water was used as a solvent), 82.9 g. of 3-mercaptopropylamine and 32.8 g. of di(3-aminopropyl)sulfide were recovered, both of these products being anti-Markownikoff products.

A sample of said 3-mercaptopropylamine product was recrystallized from toluene. The melting point of the recrystallized product was found to be 109–110° C., and an Very litle sulfide was formed in either of these runs, and practically all of the aminopentene salt which was not converted to thiol was recovered unchanged.

EXAMPLE VI

In this example, hydrogen sulfide was reacted with 3-aminocyclohexane hydrochloride to form cis and trans-2-aminocyclohexanethiol by the radiation technique and procedure used in Example II.

Three separate runs were made in the condensation of 3-aminocyclohexene hydrochloride with hydrogen sulfide, of which the following is typical. A solution of 155 g. (1.16 moles) of the amine hydrochloride, 116 g. of methanol, 78 g. (2.3 moles) of hydrogen sulfide and 4 ml. of trimethyl phosphite was irradiated in the reactor described previously with a 450 watt mercury vapor lamp for 2.5 hours; the temperature was kept near room temperature by circulation of tap water. The pressure gradually rose from about 100 p.s.i.g. initially to 243 p.s.i.g. The contents of the reactor were vented into a 500-ml. 3-necked flask. All subsequent operations were carried out under nitrogen with the careful exclusion of air. Sodium hydroxide (50 g., 1.25 moles) in 300 ml. of water was added to the solution; this was stirred until solution of the salts was complete. Then 100 ml. of benzene was added, the mixture was stirred for a moment, and the layers were separated. The aqueous layer was extracted twice more with a mixture of about 50 ml. of benzene and 25 ml. of isopropyl alcohol each time. The extracts were combined and distilled through an 18-inch column packed with glass helices, keeping the pot temperature below 100° C. The residue was then flashed through a 15-inch Vigreux column under reduced pressure, keeping the pot temperature below 110° C.; unreacted aminocyclohexene (30–40 g.) was collected, and a solid appeared in the column head. The column was washed down with hot benzene into the residual oil, and the resulting benzene solution was evaporated under aspirator pressure, keeping the pot as cool as possible. The residue was sublimed and distilled through a short Vigreux under high vacuum to a pot temperature of about 170° C., giving 49 g. of beautiful white solid. This was dissolved in 100 ml. of benzene; cooling gave fine white crystals of cis-2-aminocyclohexanethiol, M.P. 117–118° C.; other runs and crops of crystals gave M.P. 119–120° C. and 121–122° C. The sulfur content of this product (found by —SH titration) was 25.2 wt. percent, compared to a calculated sulfur content (for $C_6H_{13}NS$) of 24.4 wt. percent.

The benzene mother liquor was evaporated and the residue distilled under reduced pressure, giving trans-2-aminocyclohexanethiol having a boiling point of 129–131° C. at 60 mm. and 108–109° C. at 30 mm., and it solidified to a white solid having a melting point of 80° C., compared with a literature melting point value of 79–80° C.

The cis-2-aminocyclohexanethiol hydrochloride was prepared by introducing hydrogen chloride into a methanol solution of the free cis-2-aminocyclohexanethiol, and it had a melting point of 258–261° C. (from methanol-ether). Elemental analysis of the cis-2-aminocyclohexanethiol hydrochloride is set forth below in Table III.

Table III

|  | Calculated (for $C_6H_{14}ClNS$), wt. percent | Found, wt. percent |
| --- | --- | --- |
| Carbon | 42.97 | 42.77 |
| Hydrogen | 8.41 | 8.44 |
| Chlorine | 21.14 | 21.7 |
| Nitrogen | 8.35 | 8.35 |
| Sulfur | 19.12 | 19.75 |

Passing hydrogen chloride into an isopropyl alcohol solution of the free trans-2-aminocyclohexanethiol gave the trans-2-aminocyclohexanethiol hydrochloride with a melting point of 226–227° C. (from methanol), compared to a literature melting point value of 225° C. Elemental analysis of the trans-2-aminocyclohexanethiol hydrochloride is set forth below in Table IV.

Table IV

|  | Calculated (for $C_6H_{14}ClNS$), wt. percent | Found, wt. percent |
| --- | --- | --- |
| Carbon | 42.97 | 43.06 |
| Hydrogen | 8.41 | 8.56 |
| Chlorine | 21.14 | 21.5 |
| Nitrogen | 8.35 | 8.54 |
| Sulfur | 19.12 | 19.72 |

The existence of the cis-structure was established by benzoylation of cis-aminocyclohexanethiol, which resulted in a mixture of bis(cis-2-benzamidocyclohexyl)disulfide having a melting point of 219–220° C. (from methanol-$CHCl_3$) and cis-2-benzamidocyclohexylthiolbenzoate having a melting point of 150.5–151.5° C. (from benzene), compared with literature melting point values for these compounds of 203–206° C. and 147–148° C., respectively.

EXAMPLE VII

In this example, 2-butenylamine hydrochloride was reacted with hydrogen sulfide as follows.

A 96.9 grams quantity of 2-butenylamine hydrochloride, 68 grams of $H_2S$ and 3 ml. of trimethyl phosphite were charged to a reactor along with 100 grams of methyl alcohol and irradiated with a 450 watt mercury vapor lamp at room temperature and autogeneous pressure for 150 minutes. Fifty-four grams of a salt of an amino-substituted butyl mercaptan was recovered. This product was converted to the free amine by adding solid sodium hydroxide under a nitrogen atmosphere and thereafter adding a few pieces of Dry Ice to neutralize the excess sodium hydroxide. Distillation of the product yielded a free mercaptoamine. A center cut from this distillation, boiling at 83 to 87° C. at 52 mm. Hg absolute pressure crystallized on standing. This crystalline material was recrystallized from pentane and toluene and then from ether to yield a crystalline material melting 65 to 66.5° C. A portion of this material was then converted to the hydrochloride by dissolving the compound in ether and introducing hydrogen chloride. The hydrochloride melted at 154 to 157° C. Elemental analysis of the amino-butenethiol hydrochloride is set forth in Table V.

Table V

|  | Calculated (for $C_4H_{12}ClNS$), wt. percent | Found, wt. percent |
| --- | --- | --- |
| Carbon | 33.90 | 34.1 |
| Hydrogen | 8.55 | 8.8 |
| Nitrogen | 9.89 | 10.55 |

The aminobutanethiol hydrochloride was then analyzed by nuclear magnetic resonance (NMR). The NMR spectrum of this hydrochloride using a Varian V–4300° C., 60 mc. high resolution spectrometer, determined by examining the sample in $D_2O$ solution using benzene as the external standard, showed that the methyl group resonance occurred as a triplet. This is indicative of 1-amino-2-butanethiol, since 1-amino-3-butanethiol would appear as a doublet in an NMR spectrum.

In a control run, an attempt was made to react $H_2S$ and 1-amino-3-butene under the conditions described above. In this run in which the acid salt of the amine was not used, no reaction occurred.

Various modifications and alterations of this invention will become apparent to those skilled in the art, without departing from the scope and spirit of this invention, from the foregoing discussion, and it should be understood that this invention is not to be limited unduly to that set forth herein for illustrative purposes.

We claim:

1. A process for preparing sulfur compounds, which comprises neutralizing an amino-substituted ethylenically unsaturated compound to form a salt thereof; treating the said salt with a compound selected from the group consisting of hydrogen sulfide and a primary mercaptan in the presence of a free radical catalyst, and recovering the resulting sulfur compounds formed by said reaction.

2. A process for preparing sulfur compounds, which comprises neutralizing an amino-substituted olefin to form a salt thereof having the general formula

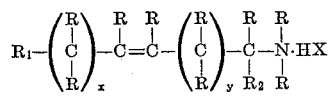

where

R is selected from the group consisting of hydrogen and alkyl radicals having 1 to 10 carbon atoms,
$R_1$ and $R_2$ are selected from the group consisting of hydrogen and alkyl radicals having 1 to 10 carbon atoms, and together can form a covalent bond,
X is selected from the group consisting of chloride, bromide, iodide, acetate, and propionate radicals,
$x$ is an integer from 0 to 3, and
$y$ is an integer from 0 to 5, reacting said salt with a compound selected from the group consisting of hydrogen sulfide and a primary mercaptan having 1–12 carbon atoms per molecule in the presence of a free radical catalyst and recovering the resulting sulfur compounds formed by said reaction.

3. A process for preparing sulfur compounds, which comprises neutralizing an amino-substituted alpha-olefin to form a salt thereof; and reacting said salt with a compound selected from the group consisting of hydrogen sulfide and a primary mercaptan having 1–12 carbon atoms per molecule in the presence of a free radical catalyst, and recovering the resulting sulfur compounds formed by said reaction.

4. A process for preparing sulfur compounds, which comprises neutralizing an amino-substituted olefin to form a salt thereof; having the general formula

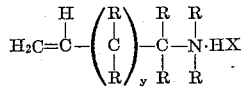

where

R is selected from the group consisting of hydrogen and alkyl radicals having 1 to 10 carbon atoms,
X is selected from the group consisting of chloride, bromide, iodide, acetate, and propionate radicals, and
$y$ is an integer from 0 to 5, treating said salt with a compound selected from the group consisting of hydrogen sulfide and a primary mercaptan having 1–12 carbon atoms per molecule in the presence of a free radical catalyst and recovering the resulting sulfur compounds formed by said reaction.

5. The process according to claim 4 wherein said free radical catalyst is ultraviolet radiation.

6. The process according to claim 4 wherein said free radical catalyst is a peroxide compound.

7. The process according to claim 4 wherein said free radical catalyst is actinic radiation.

8. The process according to claim 4 wherein said free radical catalyst is an azo compound.

9. The process according to claim 4 wherein said reaction is carried out in the presence of an organic trialkyl phosphite promoter.

10. The process which comprises reacting allylamine hydrochloride with hydrogen sulfide in the presence of actinic radiation, and recovering the resulting sulfur compounds formed by the reaction.

11. The process according to claim 10 wherein said actinic radiation is ultraviolet radiation.

12. The process which comprises reacting 3-aminobutene-1 hydrochloride with hydrogen sulfide in the presence of ultraviolet radiation, and recovering the resulting sulfur compounds formed by the reaction.

13. The process which comprises reacting 3-aminocyclohexene hydrochloride with hydrogen sulfide in the presence of ultraviolet radiation and trimethyl phosphite, and recovering the resulting sulfur compounds formed by the reaction.

14. The process which comprises reacting 2-butenylamino hydrochloride with hydrogen sulfide in the presence of ultraviolet radiation and trimethyl phosphite, and recovering the resulting sulfur compounds formed by the reaction.

References Cited by the Examiner

UNITED STATES PATENTS

| | | | |
|---|---|---|---|
| 2,398,480 | 4/1946 | Vaughan et al. | 204—158 |
| 3,050,452 | 8/1962 | Louthan | 204—158 |

OTHER REFERENCES

Kharasch: "Organic Sulfur Compounds," Pergamon Press, New York (1961), p. 122.

JOHN H. MACK, *Primary Examiner.*

CHARLES B. PARKER, *Examiner.*

A. H. SUTTO, H. S. WILLIAMS, *Assistant Examiners.*